United States Patent
Mangano et al.

(10) Patent No.: US 8,631,184 B2
(45) Date of Patent: Jan. 14, 2014

(54) INTERCONNECTION METHOD AND DEVICE, FOR EXAMPLE FOR SYSTEMS-ON-CHIP

(75) Inventors: Daniele Mangano, Messina (IT); Ignazio Antonio Urzi', Voreppe (FR)

(73) Assignees: STMicroelectronics (Grenoble 2) SAS, Grenoble (FR); STMicroelectronics S.r.l., Agrate Brianza (IT)

( * ) Notice: Subject to any disclaimer, the term of this patent is extended or adjusted under 35 U.S.C. 154(b) by 185 days.

(21) Appl. No.: 13/112,802

(22) Filed: May 20, 2011

(65) Prior Publication Data
US 2011/0289253 A1 Nov. 24, 2011

(30) Foreign Application Priority Data
May 20, 2010 (IT) .......................... TO2010A000420

(51) Int. Cl.
G06F 13/20 (2006.01)
G06F 13/36 (2006.01)
G06F 13/40 (2006.01)

(52) U.S. Cl.
CPC .......... *G06F 13/4027* (2013.01); *G06F 13/404* (2013.01)
USPC ............................. 710/310; 710/311; 710/315

(58) Field of Classification Search
USPC ....................................................... 710/310
See application file for complete search history.

(56) References Cited

U.S. PATENT DOCUMENTS

| | | | |
|---|---|---|---|
| 6,195,722 B1 * | 2/2001 | Ram et al. ...................... | 710/310 |
| 6,317,806 B1 * | 11/2001 | Audityan et al. ............. | 711/101 |
| 6,449,701 B1 * | 9/2002 | Cho .............................. | 711/154 |
| 6,493,800 B1 * | 12/2002 | Blumrich ...................... | 711/129 |
| 6,996,559 B1 * | 2/2006 | Beshai .............................. | 1/1 |
| 7,373,444 B2 * | 5/2008 | Asano et al. .................. | 710/110 |
| 7,398,361 B2 * | 7/2008 | Gunna et al. .................. | 711/146 |
| 2002/0083256 A1 * | 6/2002 | Pannell ........................ | 710/306 |
| 2004/0024947 A1 | 2/2004 | Barth et al. | |
| 2006/0190655 A1 * | 8/2006 | Kautzman et al. ............ | 710/306 |
| 2006/0294286 A1 * | 12/2006 | Duerk et al. .................. | 710/306 |
| 2007/0106844 A1 * | 5/2007 | Ohkawa ....................... | 711/130 |

OTHER PUBLICATIONS

Italian Search Report for corresponding Italian Application No. ITTO20100420, printed on Dec. 10, 2010, 8 pages.

* cited by examiner

*Primary Examiner* — Ryan Stiglic
(74) *Attorney, Agent, or Firm* — Seed IP Law Group PLLC

(57) ABSTRACT

Transactions of the request/response type between a first circuit module and a second circuit module operating with incompatible protocols or interfaces envisage organizing a queue of memory locations for storing transaction information items and transaction identifiers associated to said transactions and implementing the transactions via operations of reading/writing of the locations in the queue, mapping on the transaction identifiers information for management of the queue.

18 Claims, 2 Drawing Sheets

INTERCONNECTION METHOD AND DEVICE, FOR EXAMPLE FOR SYSTEMS-ON-CHIP

BACKGROUND

1. Technical Field

The disclosure relates to interconnection techniques.

The disclosure has been developed with attention paid to its possible application to so-called Systems-on-Chip (SoCs).

Embodiments include applications of a consumer type (digital home video, mobile and multimedia applications).

2. Description of the Related Art

In the production of integrated circuits, especially of particularly complex products of the System-on-Chip (SoC) type, it is common practice, for example, for reducing time-to-market, to use, or rather re-use, already existing IP (Intellectual Property) modules. This practice also takes into account performance improvements and new functions and leads to devising rather heterogeneous multi-protocol systems, such as to incorporate IPs of various nature and origin, for example both "external" IPs and IPs developed in house.

Designers are hence inclined to integrate advanced components (for example, CPUs of an ARM type based upon the AMBA protocol) made available by different sources. This situation, concomitantly with the desire to limit the development and production costs, leads to re-use of IP modules developed previously, giving rise to multi-protocol solutions such as to incorporate different elements operating on the basis of different communication technologies.

In the presence of transactions of a request/response type, there may hence arise the desire to get different protocols to interact with one another. In the case of protocols that do not prove mutually compatible, it is possible to resort to the solution of storing at a local level the information that cannot be converted. Thus, the response transactions can be reconstructed according to the original protocol.

A situation of the above type is represented schematically in FIG. 1, where the reference numbers 10 and 20 designate two circuit modules of the type commonly referred to as "islands." The first island operates according to a first protocol, here referred to as protocol X, whilst the second island operates with a second protocol, here referred to as protocol Y.

The reference number 30 designates a module that is able to handle the request transactions (Req) and the response transactions (Rsp) by resorting to a conversion queue 32.

A solution of this type requires storing in the module 30, functioning as bridge, further information on all the information that is to be conveyed between the modules 10 and 20.

If it is possible to expect a determined order, in the sense that the responses are presented in the same order as the requests, the queue 32 can assume the appearance of a queue of a FIFO (First-In First-Out) type. There may, however, arise situations in which, in the communications between different modules (it will be appreciated that the reference to two islands 10, 20 is an example in so far as these modules can be present in a larger number), it is not expected that the response transactions follow the same order as the request transactions.

Such a situation (commonly referred to as OOO, i.e., Out-Of-Order) can arise in the case of high-performance CPUs. The capacity of handling OOO situations can represent in any case a point of advantage for the IPs comprised in the circuit; it is hence desirable for this possibility to be allowed.

To handle situations of an OOO type it is possible to resort to solutions that enable, within the queue 32, search operations to be carried out in order to reconstruct original information. This results, however, in considerable limitations in terms of clock frequency and of "overheads" as regards the occupation of area on silicon.

FIG. 2 is a schematic illustration of a solution that is able to handle situations of an OOO type. Known as Content-Addressable Memory (CAM), this is a solution that can be used also for implementing cache memories in processor systems.

The CAM architecture acts between a module or island 10 operating with a protocol X and a module or island 20 operating with a protocol Y with a queue mechanism in which each position or location in the queue 32 comprises two fields, designated respectively as ELEM and ID. The first field (ELEM1, ELEM2, . . . , ELEMn, where n is the "depth" of the queue) is used for storing the information regarding the transaction that cannot be converted, whilst the second field (ID1, ID2, . . . , IDn) is used as a key and contains a transaction identifier. The number n of elements comprised in the queue 32 identifies the number of transactions that may be pending at a given instant of time.

The operations of reading and writing in the queue are managed via normal read and write pointers generated by respective generators 321 (read pointers) and 322 (write pointers).

The module 30 illustrated in FIG. 2 "dialogues" with the protocol X and with the protocol Y on the basis of interface lines of which the ones designated by REQ and RSP refer to the functions of interface of the request transactions and response transactions (data-control signals).

The lines designated by ID carry a signal/information that is to enable non-ambiguous identification of the transactions (or packets) in the system by resorting in general to a union between a packet/transaction identifier and a source identifier. This information is available in general for any protocol, and the signal designated by R_ID, used for associating the responses to the requests, can constitute a replica of the information ID.

The generator of the read pointers is driven by respective blocks 323 sensitive to the identifiers ID1, ID2, ID3, IDn and to the information available on the line R_ID coming from the protocol Y. In order to find in the queue 32 the information used for reconstructing the response transactions, the CAM architecture of FIG. 2 hence implements a mechanism of control/comparison in parallel between the information R_ID coming from the module 20 (protocol Y) and all the indicators ID in the queue 32. The signal ID can hence result from the logical union of the source identifier ID and of the transaction identifier ID.

Since each identifier can comprise a certain number of bits (for example, from ten to fifteen), the search mechanism described is somewhat burdensome both in terms of circuit complexity and as a result of the negative effects on the speed of the module. The choice of recourse to this type of architecture for interfacing different protocols is somewhat penalizing in terms of requirements of area on silicon and of limitation of the clock frequency.

BRIEF SUMMARY

Various embodiments have the purpose of providing a solution that is able to improve the module transactions outlined previously.

Said purpose is achieved thanks to a method having the characteristics recalled specifically in the ensuing claims.

Various embodiments also regard a corresponding device.

The claims form part of the teaching provided herein in relation to the invention.

Various embodiments envisage effecting request/response transactions (REQ/RSP) between a first circuit module (or island) and a second circuit module (or island) operating with different protocols or incompatible interfaces; in this regard, the expression "different protocols" is used herein to indicate also the case of different profiles or versions of what formally is one and the same protocol.

In various embodiments, the above can be obtained by organizing a queue of memory locations and storing in said memory locations transaction information items and transaction identifiers associated to said transactions; said transaction identifiers are transmitted between the first module and the second module with, mapped thereon, said identifier information for management of the queue, for example in the form of pointers, which enable reconstruction of a response transaction by addressing directly, without having to conduct a search, the location where the corresponding request transaction is stored.

Various embodiments enable replacement of CAM architectures, which are costly and slow, with low-cost and high-speed circuits.

Various embodiments simplify the integration of external IPs and implementation of solutions of interoperability between a number of protocols, also improving the performance in terms of re-usability of the IP modules.

Various embodiments enable management of the communication between protocols in themselves incompatible in the case of OOO conditions, i.e., even in conditions where there does not exist the expectation that the response transactions are in the same order as the request transactions.

Various embodiments enable interfacing in a simple way of subsystems that are based upon different and incompatible protocols even in OOO conditions, avoiding recourse to CAM architectures.

Various embodiments enable solution of the problem of developing high-performance systems of a SoC type operating with multiple protocols incorporating IPs that are different at a native level, at the same time reducing time-to-market, avoiding penalization in terms of area on silicon, and without giving rise to negative effects on the clock frequency.

Various embodiments are based upon the concept of mapping the information for management of the queue on the signal ID.

In various embodiments, this is possible by assuming, in a realistic way, that at least one of the modules or islands involved does not have the expectation of a pre-established order. That is, the original signal ID generated in the other interconnection island is not expected since there does not exist the need to carry out a filtering, which arises when the interconnection ensures a predetermined order.

BRIEF DESCRIPTION OF THE SEVERAL
VIEWS OF THE DRAWINGS

The embodiments will now be described, purely by way of non-limiting example with reference to the annexed representations, wherein:

FIGS. 1 and 2 have already been described previously;

DETAILED DESCRIPTION

Illustrated in the ensuing description are various specific details aimed at providing an in-depth understanding of the embodiments. The embodiments can be obtained without one or more of the specific details, or with other methods, components, materials, etc. In other cases, known structures, materials or operations are not illustrated or described in detail so that the various aspects of the embodiments will not be obscured.

The reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment," which may be present in different points of this description, do not necessarily refer to one and the same embodiment. Furthermore, particular conformations, structures or characteristics can be combined in any adequate way in one or more embodiments.

The reference numbers used herein are provided merely for reasons of convenience and hence do not define the sphere of protection or the scope of the embodiments.

Figure 1:
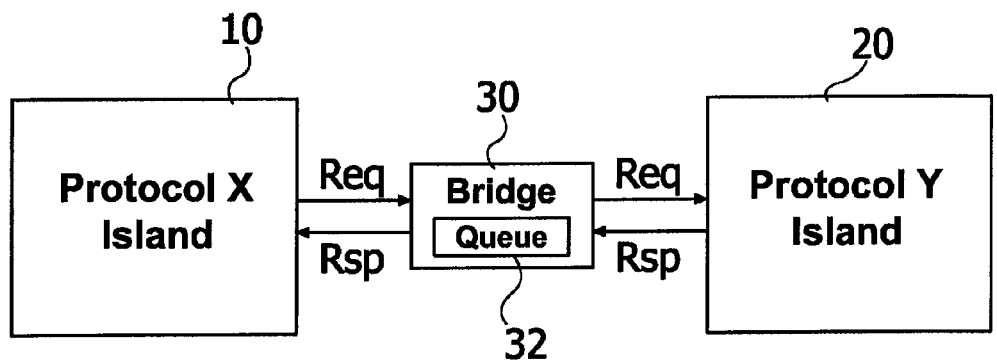
Figure 4:
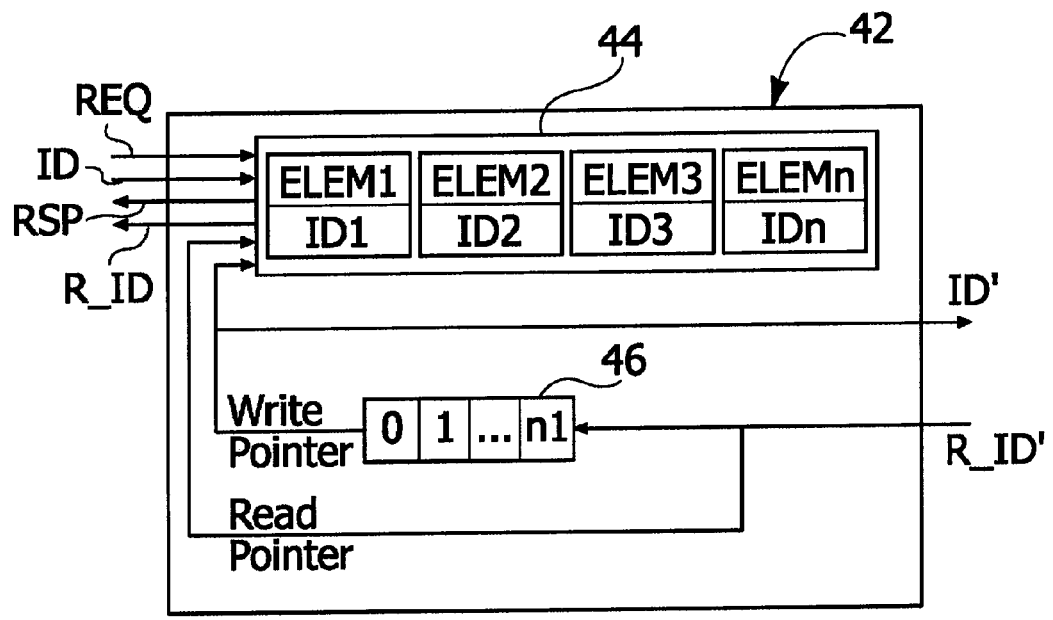
FIG. 4 illustrates a specific implementation of an embodiment.

The context to which the embodiments considered herein refer is substantially the same as the one already examined with reference to FIG. 1, i.e., the possible interconnection, for example within a System-on-Chip (SoC), between a first circuit module or island 10, operating with a protocol X, and a second circuit module or island 20, operating with a protocol Y, implemented via a module 40 set between the modules 10 and 20 and comprising a "bridge" circuit 42 having the characteristics described more fully in what follows with reference to FIG. 4.

Parts and elements that are the same or equivalent to parts and elements already considered previously will hence not be presented and described again.

Figure 3:
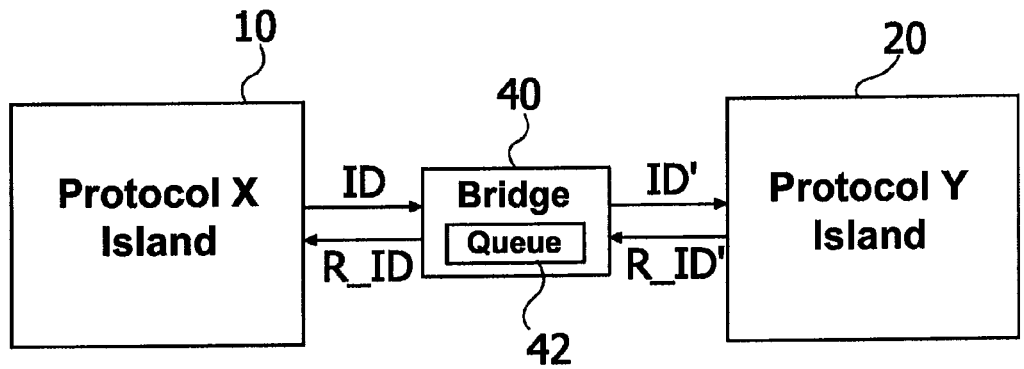
FIG. 3 is a schematic illustration of the basic concept of an embodiment.

In the example of embodiment considered in FIG. 3, the module 40 receives at input the signal ID generated in the island 10 (protocol X) and generates as output a new signal ID', different from the input signal, obtained via a mapping operation described more fully in what follows. Any communication protocol (i.e., whatever the protocol Y of the island 20) of the signal R_ID' returned by the island 20 in response to the signal ID' can be a replica of ID'. The information conveyed by the signal R_ID' can be used for selecting from a queue 44 the queue element in which the original information is available, without the need to perform a search operation.

The queue 44 is similar to the queue 32 already described previously: each position or location in the queue 44 hence comprises two fields, designated by ELEM and ID, respectively. The first field (ELEM1, ELEM2, . . . , ELEMn, where n is the "depth" of the queue) is used for storing the information regarding the transaction, whilst the second field (ID1, ID2, . . . , IDn) is used as a key and contains a transaction identifier. Once again, the number n of elements comprised in the queue 44 identifies the number of transactions that are likely to be pending at a given instant of time.

Embodiments of module 40 function as a bridge between the module or island 10 (protocol X) and the module or island 20 (protocol Y) by operating in the following way:

when a new transaction is received from the island 10, the corresponding ID is written in the queue 42 together with the information to be stored;

the transaction is then treated so that it is suitable for being managed by the protocol Y of the island 20 and sent at output by mapping on the signal ID' the information regarding the location in the queue 44 used for said purpose;

when then there arrives from the island 20 as response a response transaction, the corresponding signal R_ID' is used for identifying (without having to perform any search) the correct memory location and reading therein both the corresponding ID and the original information that has been stored therein; the response transaction can thus be reconstructed on the basis of the protocol X and sent at output to the island 10.

Operating in this way, the island 20 (i.e., a slave or destination of a communication) in practice sees the island 10 (i.e., a master or initiator of a communication) as a normal module IP that generates a certain number of IDs, which enables masking of the complexity of the island 10 and simplification of the structure of the island 20.

As regards the fact that the transaction is "treated" so that it is suitable for being managed by the protocol Y of the island 20 (and sent at output by mapping on the signal ID' the information regarding the location in the queue 44 used for said purpose), reference may be made, of course without this implying any limit, to the example of the "user-defined" signals of the protocol AXI (de-facto standard): given that it is necessary to integrate two islands that are incompatible in terms of size or for the very presence of said signals, various embodiments as exemplified herein enable solution of the problem in a simple way.

As illustrated in FIG. 4, in various embodiments, the queue 44 can be managed via read pointers and write pointers, for example resorting to a queue of the pointers designated by 46. Management of the control of the flows can be carried out with any known mechanism.

In various embodiments, the queue 46 of the pointers can be a FIFO (First-In First-Out) queue. The queue 46 can be used for storing the write pointers available and is initialized (reset conditions) with values of from 0 to n−1, where n is the depth of the queue 44.

The organization as a FIFO queue 46 enables handling of the OOO condition in a simple way. The write pointer to be used for writing the information on the current transaction can be derived from the head of the FIFO queue 46. When there is a return response, since one location in the queue will be empty, the value R_ID' is used as read pointer and at the same time written in the queue of the pointers. In this way, the corresponding location in the queue 44 can be re-used soon to write information associated to a new request transaction.

In various embodiments, the function of mapping recalled more than once previously, aimed at mapping on the transaction identifiers information for management of the queue, may involve mapping of the write pointer on ID'.

Even though, in general, ID' could have a larger number of bits, in various embodiments it is possible to use only the $\log_2 n$ least significant bits (LSBs). Likewise, it is possible to use the $\log_2 n$ least significant bits (LSBs) of R_ID' as read pointer (which can be a copy of ID').

On the signal R_ID, the original identifier derived from the queue 44 can be mapped.

The mechanism described expects that, in a way independent of the order of the responses, the queue of the pointers contains at each moment the pointers associated to all the empty queue locations.

Figure 2:
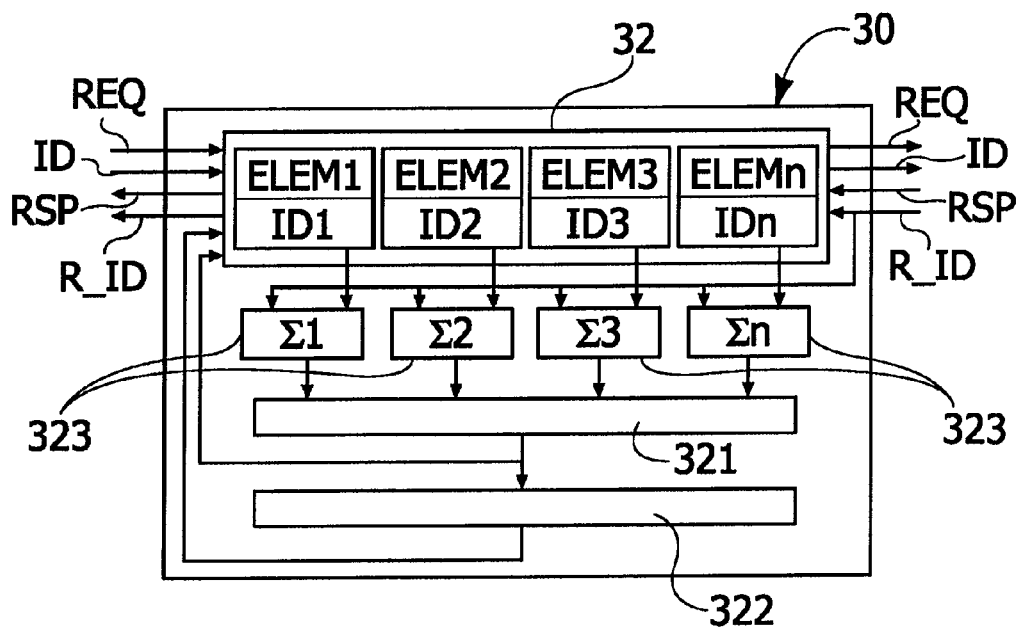

Comparing the architecture of a CAM type of FIG. 2 with the architecture represented in FIG. 4, it is evident that various embodiments reduce considerably the circuit complexity and enable any search mechanism to be avoided.

Of course, without prejudice to the principle of the invention, the details of implementation and the embodiments may vary, even significantly, with respect to what has been illustrated herein purely by way of non-limiting example, without thereby departing from the scope of the invention as defined by the claims.

In this regard, it is once again recalled that, as used herein, the expression "different protocols" also comprises the case of different profiles or versions of what formally can be one and the same protocol, whilst various embodiments envisage in general effecting request/response transactions between a first circuit module and a second circuit module operating with different protocols or incompatible interfaces.

As described herein, various transaction architectures may employ information identifying the source (e.g., master ID) and transaction IDs. Potential interfacing problems between two domains may arise from possible ID conflicts and from differing ID bit lengths.

Accordingly, transfer requests from the first IP domain may be translated into requests having temporary master IDs and temporary transaction IDs for use in the second IP domain. Subsequently, the temporary IDs are then translated back to the original ID when requested data or an acknowledgement is provided to the first IP domain.

For example, in various embodiments, the original IDs for pending transactions may be stored within a queue and employ the position within the queue along with the original ID to produce a unique ID. Encoded within the unique ID may also be information that specifies the queue location. Accordingly, the original ID may be accessible by simple addressing.

However, there are a number of buses where there may exist potential ID conflicts. For example, such ID conflicts may occur if the IP blocks interfaced through the bridge 42 (FIGS. 3, 4) comprise more than one master, because in this case, the bridge should be prevented from using translated IDs that match the IDs of a local master.

Accordingly, in order to avoid such ID conflicts, the bridge 42 may comprise an additional module or circuit configured to distinguish between master requests and slave responses such that only outgoing master requests and returned slave responses are stored in a queue and translated, i.e., incoming master requests and outgoing slave responses may not be translated.

Moreover, in order to avoid potential ID conflicts, an additional ID prefixing mechanism may be used. One such example of ID prefixing is provided in AMBA AXI interconnect, however, other ID prefixing may also be used.

Accordingly, in some embodiments, the bridge 42 can be configured to provide one unique translated master ID with other outgoing master IDs incorporated into translated transaction Ids. In such a configuration, the number of transaction IDs is only limited by the depth of the queue.

Moreover, the circuitry of bridge 42 may be provided such that additional circuitry is also included. For example, the circuitry may be provided so as to manage out-of-order transactions. Out-of-order transactions may occur when responses do not occur in the order of requests. In this case, additional memory management beyond the simple circular buffer can be used to keep track of used and free locations. Examples may include linked lists, dedicated pointer structures, and the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to effect request/response transactions between a first and a second circuit module, the method comprising:
   providing a queue of memory locations;
   receiving from the first circuit module, transaction information items and transaction identifiers coupled to said transaction information items;
   storing in said memory locations said transaction information items and said transaction identifiers;
   transmitting to said second circuit module modified transaction identifiers, said modified transaction identifiers having mapped thereon managing information for said queue of memory locations to reconstruct response transactions by addressing a location in said queue of memory locations for each response transaction, the location having stored therein transaction information items and a transaction identifier corresponding to said response transaction.

2. The method of claim 1, further comprising:
   effecting said request/response transactions as read/write operations of the memory locations in said queue of memory locations using pointers; and
   mapping onto said modified transaction identifiers managing information for said queue of memory locations as pointers to respective memory locations in the queue.

3. The method of claim 1, further comprising:
   writing in the location in said queue of memory locations a request transaction received from said first circuit module along with a corresponding transaction identifier;
   adapting said request transaction to said second circuit module; and
   sending to said second circuit module said adapted request transaction having coupled a request transaction identifier modified by mapping thereon managing information identifying the location in said queue of memory locations where the adapted request transaction is written.

4. The method of claim 3, further comprising:
   receiving from said second circuit module, in response to said adapted request transaction sent to the second circuit module, a response transaction having coupled a respective response transaction identifier;
   identifying, based on said respective response transaction identifier, the location in said queue of memory locations where said request transaction is written;
   reconstructing said response transaction in a form compatible with said first circuit module; and
   sending the reconstructed response transaction to said first circuit module.

5. The method of claim 4 wherein said respective response transaction identifier is a replica of said request transaction identifier as modified.

6. The method of claim 1 wherein said managing information for the queue of memory locations includes at least one of:
   a write pointer mapped onto a request transaction identifier, and
   a read pointer mapped onto a response transaction identifier.

7. The method of claim 1, further comprising:
   providing a queue of pointers,
   taking from said queue of pointers a write pointer to write in the location of said queue of memory locations a request transaction received from said first circuit module, and
   inputting to said queue of pointers a read pointer used for a response transaction received from said second circuit module, thereby permitting the location in the queue of memory locations to be re-used to write a subsequent request transaction received from said first circuit module.

8. The method of claim 7, further comprising:
   providing said queue of pointers as a FIFO (First-in First-out) queue; and
   taking said write pointer from the head of said queue.

9. A device to effect request/response transactions, comprising:
   a first circuit module configured to operate according to a first protocol;
   a second circuit module configured to operate according to a second protocol;
   a memory interposed between said first and second circuit modules including memory locations with a first field configured to store transaction information items and a second field configured to store transaction identifiers coupled therewith;
   a pointer memory configured to store at least part of a set of pointers to map onto said transaction identifiers; and
   a bridge circuit configured to provide a queue of the memory locations, the bridge circuit configured to transmit between the first and second circuit modules modified transaction identifiers, the modified transaction identifiers having mapped thereon managing information for the queue of memory locations to reconstruct response transactions by addressing a location in the queue of memory locations for each response transaction, the location having stored therein transaction information items and a transaction identifier corresponding to said response transaction.

10. The device of claim 9, comprising:
    respective transmission lines for signals conveying said transaction identifiers.

11. The device of claim 10 integrated in a System-on-Chip.

12. The device of claim 10 wherein the bridge circuit is configured to:
    effect the request/response transactions as read/write operations of the queue of memory locations using pointers, and
    map onto the modified transaction identifiers managing information for the queue of memory locations as pointers to respective memory locations in the queue.

13. The device of claim 12 wherein the bridge circuit is configured to:
    write in a location in the queue of memory locations a request transaction received from the first circuit module along with a corresponding transaction identifier,
    adapt the request transaction to the second module, and
    send to the second circuit module the adapted request transaction having coupled a request transaction identifier modified by mapping thereon managing information identifying the location in the queue of memory locations where the adapted request transaction is written.

14. The device of claim 13 wherein the bridge circuit is configured to:
    receive from the second circuit module, in response to the adapted request transaction sent to the second circuit module, a response transaction having coupled a respective response transaction identifier,
    identify, based on the respective response transaction identifier, the location in the queue of memory locations where the request transaction is written,
    reconstruct the response transaction in a form compatible with the first module, and send the reconstructed response transaction to the first circuit module.

15. The device of claim 14 wherein the bridge circuit is configured to write the respective response transaction identifier as a replica of the request transaction identifier as modified.

16. The device of claim 10 wherein the bridge circuit is configured to manage information for the queue of memory locations by writing a pointer mapped onto a request transaction identifier or reading a pointer mapped onto a response transaction identifier.

17. The device of claim 10 wherein the bridge circuit is configured to:
provide a queue of pointers,
take from the queue of pointers a write pointer to write in the location of the queue of memory locations a request transaction received from the first circuit module, and
input to the queue of pointers a read pointer used for a response transaction received from said second circuit module, thereby permitting the location in the queue of memory locations to be re-used to write a subsequent request transaction received from the first circuit module.

18. The device of claim 17 wherein the bridge circuit is configured to:
provide the queue of pointers as a FIFO (First-in First-out) queue, and
take the write pointer from the head of the queue.

* * * * *